United States Patent [19]
Izumi et al.

[11] Patent Number: 5,853,201
[45] Date of Patent: Dec. 29, 1998

[54] COOLANT PIPE CONNECTING COUPLING

[75] Inventors: Ryouiti Izumi, Okazaki; Kenji Ogura, Kariya; Soujiro Tsuchiya, Nagoya; Yoshitaka Kuroda, Anjo, all of Japan; Keiiti Isogai, Bangkok, Thailand

[73] Assignee: Nippondenso Co., Ltd., Kariya, Japan

[21] Appl. No.: 587,945

[22] Filed: Jan. 17, 1996

[51] Int. Cl.$^6$ ........................................... F16L 37/00
[52] U.S. Cl. ........................... 285/179; 285/205; 285/420; 285/208
[58] Field of Search .................. 285/159, 137.1, 285/179, 205, 163, 208, 207, 206, 420, 137.11, 124.1, 144.1

[56] References Cited

U.S. PATENT DOCUMENTS

| | | | |
|---|---|---|---|
| 4,468,054 | 8/1984 | Orth | 285/137.1 |
| 5,294,156 | 3/1994 | Kumazaki et al. | 285/137.1 |
| 5,515,696 | 5/1996 | Hutchison | 285/137.1 |
| 5,556,138 | 9/1996 | Nakajima et al. | 285/137.1 |
| 5,593,279 | 1/1997 | Hayashi | 285/205 |

FOREIGN PATENT DOCUMENTS

| | | | |
|---|---|---|---|
| 521776 | 6/1992 | European Pat. Off. | 285/137.1 |
| 60-127185 | 8/1985 | Japan . | |
| 2-006317 | 2/1990 | Japan . | |
| 4-266521 | 9/1992 | Japan . | |
| 465845 | 5/1937 | United Kingdom | 285/137.1 |

*Primary Examiner*—Eric K. Nicholson
*Attorney, Agent, or Firm*—Pillsbury Madison & Sutro LLP

[57] ABSTRACT

A coolant pipe connecting coupling in which a coolant passage is bent perpendicularly around a connecting portion has a low height connecting coupling and can reduce manufacturing costs. The coolant pipe connecting coupling includes a fixing block fixed to a connecting object by a bolt and a coolant pipe supported while being inserted into the fixing block. The coolant pipe is bent with an approximately zero bending radius. While at least an inside surface of the bending portion of the bending portion is received by the fixing block, the fixing block and the coolant pipe are fixed together. Therefore, a dimension of a connecting surface of the fixing block and the coolant pipe, that is, the height of the coolant pipe connecting coupling is set to be small. A coolant passage bent perpendicularly is not formed inside the fixing block, but coolant flow is bent perpendicularly by bending of the coolant pipe. Thus, manufacturing cost of the coolant pipe connecting coupling can be reduced.

12 Claims, 8 Drawing Sheets

COOLANT PIPE CONNECTING COUPLING

CROSS REFERENCE TO RELATED APPLICATION

This application is based on and claims priority of Japanese Patent Application No. 5-149281 filed Jun. 21, 1993, the content of which is incorporated herein by reference.

BACKGROUND OF THE INVENTION

1. Field of the Invention

The present invention relates to a coolant pipe connecting coupling having a coolant passage in a refrigerating cycle including a coolant pipe in which coolant flows.

2. Description of Related Art

Conventionally, a coolant pipe connecting coupling illustrated in FIG. 10 is used. A connecting coupling 100 is a so-called nut-and-union type connecting coupling. A cylindrical bolt 102 (union) is fastened at an end portion of a coolant pipe 101 and a nut 104 being rotatable on the coolant pipe 101 is fastened at an end portion of another coolant pipe 103. Therefore, the coolant pipes 101 and 103 are connected by fastening the bolt 102 with the nut 104 by using two spanners.

Therefore, since the two spanners are necessary for assembling the nut-and-union type connecting coupling 100, a space for operating the spanners is needed due to the placement of the spanners on a periphery of the connecting coupling 100. However, engine compartments and the like in which such refrigerating cycles are typically installed are generally quite crowded. Thus, an assembling operation in such a narrow space is difficult.

In order to solve the above-described problem, a coolant pipe connecting coupling 110 illustrated in FIG. 11 and 110' illustrated in FIG. 12 are known. An end portion of the coolant pipe 101 is connected to a fixing block 111 and the fixing block 111 is fixed to a connecting object 112 by a bolt 113 (i.e., a connecting tool). The coolant pipe 101 connected to the fixing block 111 only by the bolt 113 is connected to an inside passage 114 formed inside the connecting object 112.

In the coolant pipe connecting coupling 110 in which coolant pipe connection is carried out by using the fixing block 111, when the coolant passage is bent perpendicularly around the connecting coupling 110, the coolant pipe 101 fastened at the fixing block 111 is bent as illustrated in FIG. 11.

Therefore, a height h2 from a connecting surface 115 of the fixing block 111 to an opposite unbent portion of the coolant pipe 101 becomes large.

When the height h2 needs to be small, a perpendicular coolant passage 116 is formed inside the fixing block 111' by a cutting process as shown in FIG. 12 and a height h3 of the connecting coupling 110' is made small.

Hence, by forming the perpendicular coolant passage 116 inside the fixing block 111 by the cutting process, the manufacturing cost of the fixing block 111' is increased, so that the manufacturing cost of the coolant pipe connecting coupling 110 is increased.

SUMMARY OF THE INVENTION

In view of the foregoing problems, it is a primary object of the invention to provide a coolant pipe connecting coupling having low height connecting coupling and low manufacturing cost.

According to the present invention, a coolant pipe connecting coupling includes a fixing block fixed by a connecting tool to a connecting object having an inside passage in which fluid can flow, the fixing block having an receiving hole; and a coolant pipe supported and passing into the fixing block, the coolant pipe and the inside passage being connected by the fixing block being fixed to the connecting object. The coolant pipe has a bending portion having an L-shape at a position a specified distance from a connecting end of the inside passage and a ring portion protruding in a ring shape on a periphery of the connecting end of the inside passage, and the fixing block has a bending receiving portion for receiving at least a portion of the bending portion and a ring receiving portion for receiving the ring portion.

In the coolant pipe, the coolant pipe is bent in a L shape while at least the inside surface of the bending portion is accommodated in the fixing block. The fixing block is held between the inside of the bending portion and a sealing portion, so that the fixing block and the coolant pipe are fixed together.

In the coolant pipe connecting coupling according to the present invention as described above, since the bending portion of the coolant pipe is bent in an L shape with a small bend radius and at least the inside surface of the bending portion is held by the fixing block, a height from a connecting surface of the fixing block to an end of the coolant pipe, that is, a height of the connecting coupling is made small. Further, since the coolant passage is bent perpendicularly by bending the coolant pipe, the manufacturing cost of the coolant pipe connecting coupling in which the coolant passage is bent perpendicularly can be reduced.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EMBODIMENTS

The preferred embodiments of the present invention are hereinafter described with reference to the accompanying drawings.

Figure 1:
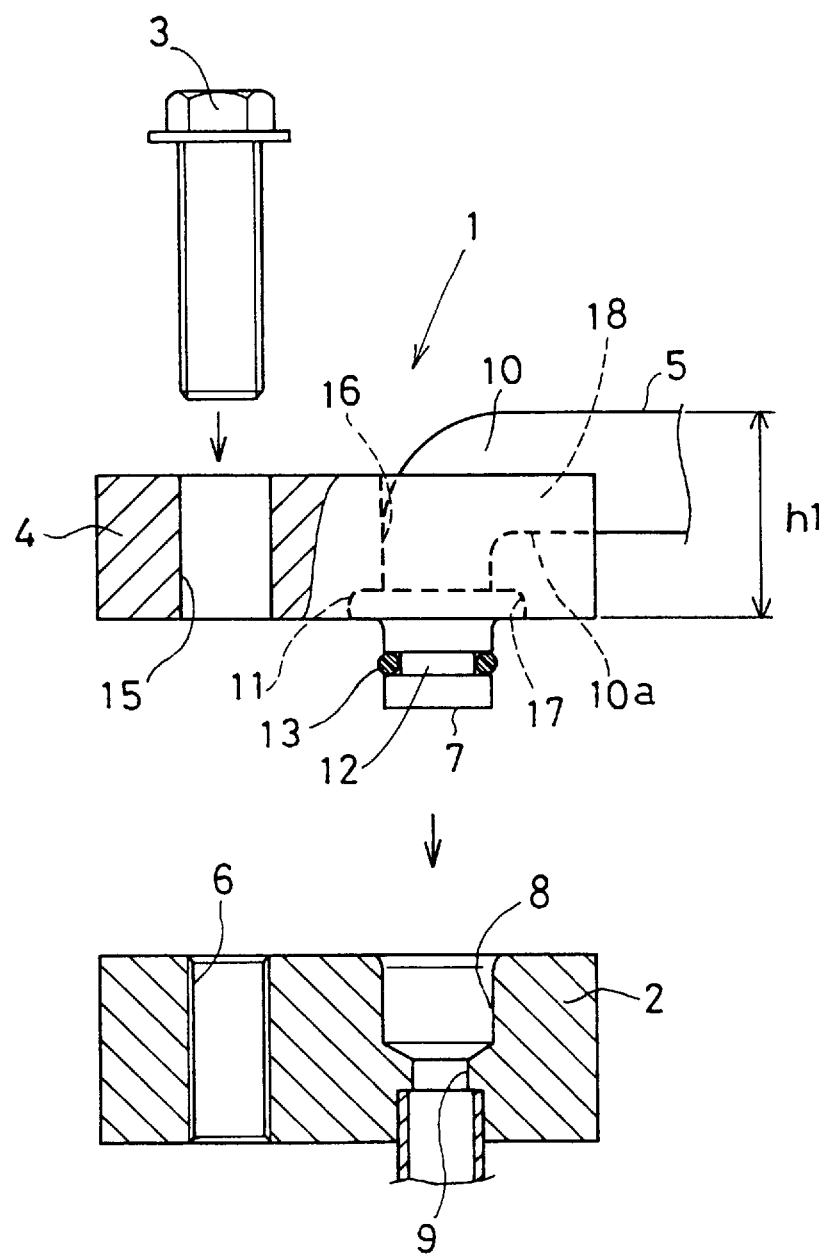
FIG. 1 is a partial side-cross sectional view illustrating a coolant pipe connecting coupling according to a first embodiment of the present invention.
Figure 2:
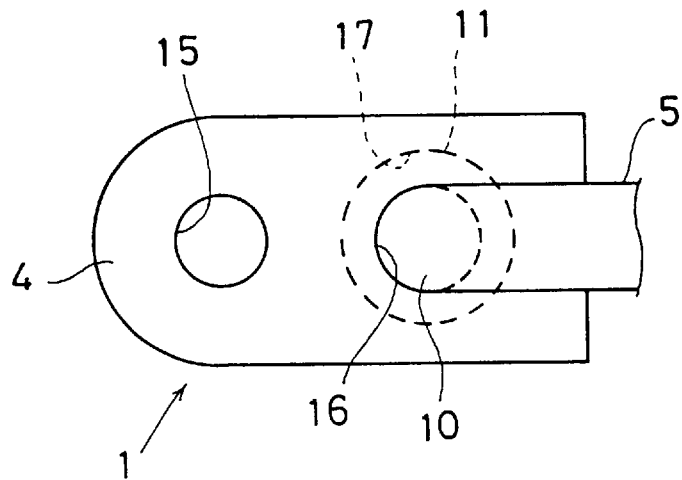
FIG. 2 is a top view illustrating the coolant pipe connecting coupling according to the first embodiment of the present invention.

FIGS. 1 and 2 illustrate a first embodiment of the present invention. FIG. 1 is a side view of a coolant pipe connecting coupling. FIG. 2 is a front view illustrating the coolant pipe connecting coupling.

A coolant pipe connecting coupling 1 is for connecting a coolant passage of an automotive refrigerating cycle and includes a fixing block 4 fixed to a connecting object 2 by a bolt 3 (i.e., a connecting tool) and a coolant pipe 5 having an end portion inserted into the fixing block 4 is supported by the fixing block 4.

The connecting object 2 to which the coolant pipe connecting coupling 1 is connected includes a female screw portion 6 for fastening the bolt 3, a concave portion 8 for receiving a connecting end portion 7 of the coolant pipe 5 and an inside passage 9 communicating with the coolant pipe 5. By connecting the fixing block 4 to the connecting object 2, the coolant pipe 5 and the inside passage 9 are connected.

The coolant pipe 5 is preferably an aluminum pipe and has, on a side of which the coolant pipe 5 is connected to the inside passage 9, a bending portion 10 bent in an L shape with an inside bending radius of almost zero. That is, the coolant pipe 5 is formed in an elbow shape at the side connected to the inside passage 9. The coolant pipe 5 has a ring seal portion 11 formed in a flange shape on a periphery of an end side of the bending portion 10 at which the coolant pipe 5 is connected to the inside passage 9. The coolant pipe 5 has a ring-shaped concave O-ring groove 12 on a periphery of the end portion between the end and the ring seal portion 11. An O-ring 13 for sealing is mounted inside the O-ring groove 12.

The fixing block 4 is an aluminum block body and has a bolt receiving hole 15 for receiving the bolt 3 and a pipe receiving hole 16 for receiving part of the connecting end portion 7 of the coolant pipe 5. A ring receiving portion 17 covering the ring seal portion 11 is disposed at a side of the pipe inserting hole 16 in contact with the connecting object 2. A bending receiving portion 18 covering an inside bending portion 10a of the bending portion 10 of the coolant pipe 5 is formed at the pipe receiving hole 16 at a side opposite the ring receiving portion 17. The ring seal portion 11 is in contact with an inside of the ring receiving portion 17 and the inside bending portion 10a of the coolant pipe 5 is in contact with the bending receiving portion 18, so that the fixing block 4 is held between the ring seal portion 11 and the inside bending portion 10a of the coolant pipe 5, and therefore, the fixing block 4 and the coolant pipe 5 are fixed together.

Next, a manufacturing method of a main portion of the coolant pipe connecting coupling 1 is explained.

A peripheral end portion of the aluminum coolant pipe 5 formed by extrusion is formed in an L-shaped elbow shape having a small inside bending radius by a shearing process or the like.

The fixing block 4 having the bolt inserting hole 15 and the pipe receiving hole 16 is formed in the aluminum block body by a cutting process, a cooling and forging press or die casting.

Next, an end portion of the coolant pipe 5 is inserted into the pipe receiving hole 16 of the fixing block 4 and the inside bending portion 10a is fixed at the bending receiving portion 18 by using a jig. At this time, the connecting end portion 7 of the coolant pipe 5 protrudes from the fixing block 4.

The O-ring groove 12 is formed on the portion of the coolant pipe 5 protruding from the fixing block 4 by using a pressing process and the ring seal portion 11 is formed inside the ring receiving portion 17. When the ring seal portion 11 is formed, the fixing block 4 is formed in such a manner that the fixing block 4 is firmly held between the inside bending portion 10a of the coolant pipe 5 and the ring seal portion 11. The fixing block 4 and the coolant pipe 5 are thereby firmly fixed together mechanically.

The O-ring 13 is mounted inside the O-ring groove 12, and manufacturing the coolant pipe connecting coupling 1 is completed.

Next, a method of connecting the coolant pipe connecting coupling 1 is explained.

The connecting end portion 7 of the coolant pipe 5 protruding from the fixing block 4 is inserted into a concave portion 8 of the connecting object 2. The bolt 3 is inserted into the bolt receiving hole 15 of the fixing block 4 and is screwed into the female screw portion 6 of the connecting object 2 and is fastened by a fastening tool such as a spanner.

Thus, connection of the coolant pipe 5 and the inside passage 9 of the connecting object 2 is completed.

In the coolant pipe connecting coupling 1 of the present embodiment, the coolant pipe 5 is bent in the L shape having the inside bending radius near zero at the periphery of the connecting end portion 7 of the coolant pipe 5 and is fixed at the fixing block 4 while the inside bending portion 10a is covered with the fixing block 4. Therefore, a height between the connecting surface of the fixing block 4 and the upper side portion of the coolant pipe 5, that is, a height h1 of the connecting coupling 1 (see FIG. 1) is decreased. Since the coolant passage is bent perpendicularly by bending the coolant pipe 5, the coolant pipe connecting coupling 1 for bending the coolant passage perpendicularly at the periphery of the connecting end portion 7 can be manufactured with a low cost.

Figure 3:
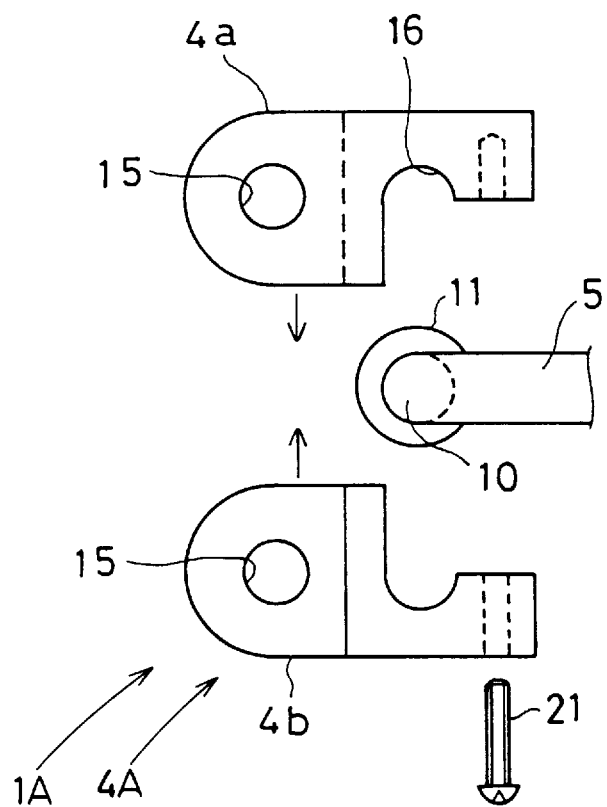
FIG. 3 is an exploded top view illustrating the coolant pipe connecting coupling according to a second embodiment of the present invention.

FIG. 3 is an exploded top view illustrating the coolant pipe connecting coupling 1A of a second embodiment.

In the second embodiment, the fixing block 4A is divided into a first block 4a and a second block 4b. The first and second blocks 4a and 4b are fixed with a screw 21. A divided surfaces of the fixing block 4 defines the pipe receiving hole 16.

The coolant pipe 5 forming the bending portion 10, the ring seal portion 11 and the O-ring groove 12 can be assembled at the fixing block 4A.

Figure 4:
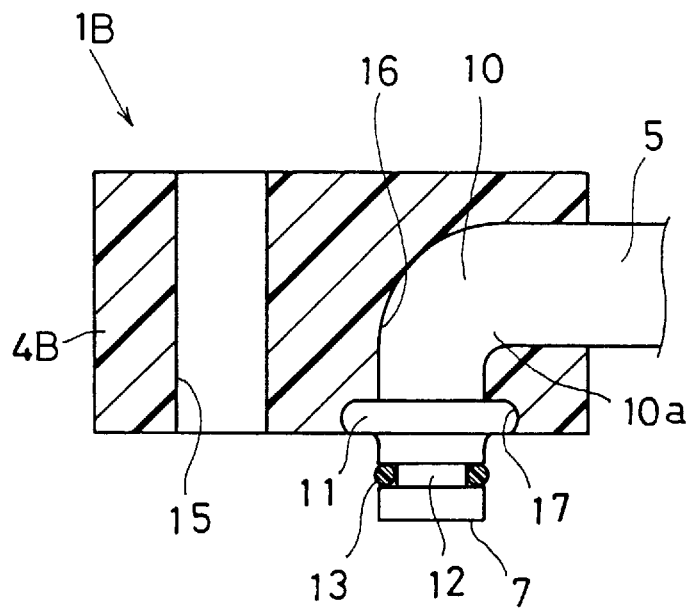
FIG. 4 is a partial side cross-sectional view illustrating the coolant pipe connecting coupling according to a third embodiment of the present invention.
Figure 5:
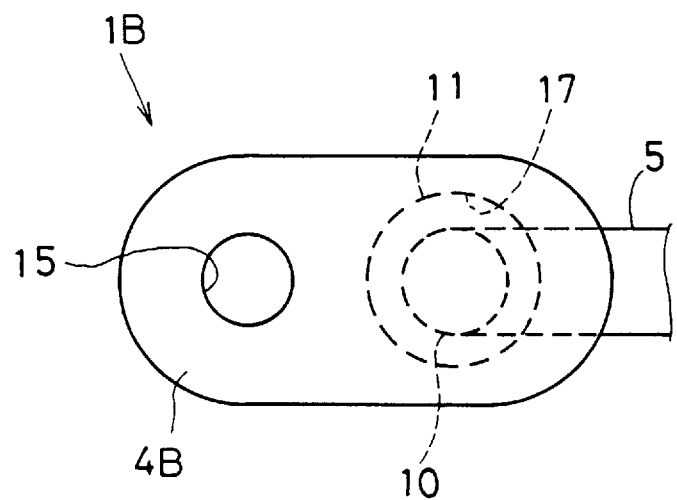
FIG. 5 is a top view illustrating the coolant pipe connecting coupling according to the third embodiment of the present invention.

FIGS. 4 and 5 illustrate a third embodiment. FIG. 4 is a partial side cross-sectional view illustrating a coolant pipe connecting coupling 1B. FIG. 5 is a top view illustrating the coolant pipe connecting coupling 1B.

In the third embodiment, the fixing block 4B is made of resin (for example, nylon resin, polypropylene resin, polyoxymethylene resin, epoxy resin, polyester resin, or the like). The resin fixing block 4B is molded on a periphery of the bending portion 10 of the coolant pipe 5 forming the bending portion 10, ring seal portion 11 and the O-ring groove 12.

Figure 6:
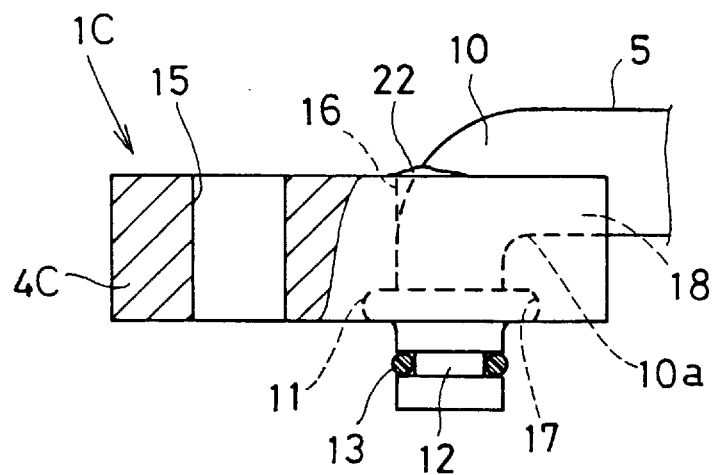
FIG. 6 is a partial side cross-sectional view illustrating a coolant pipe connecting coupling according to a fourth embodiment of the present invention.
Figure 7:
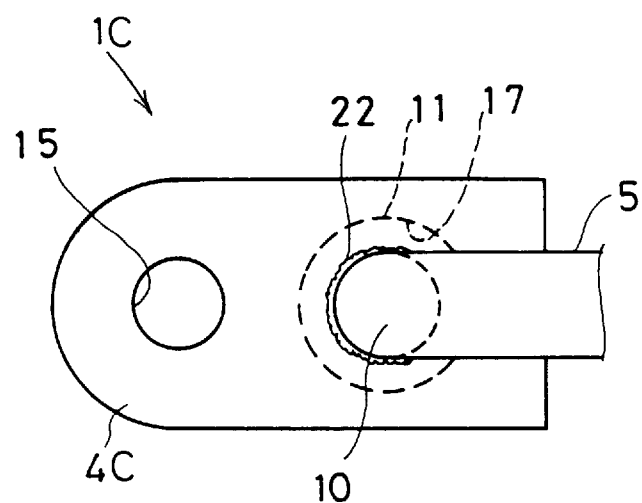
FIG. 7 is a top view illustrating the coolant pipe connecting coupling according to the fourth embodiment of the present invention.

FIGS. 6 and 7 illustrate a fourth embodiment. FIG. 6 is a side partial cross-sectional view illustrating the coolant pipe connecting coupling iC. FIG. 7 is a top view illustrating the coolant pipe connecting coupling 1C.

In the fourth embodiment, a joining structure such as a braze 22, a weld or the like is provided between the pipe receiving hole 16 of the aluminum fixing block 4C and the aluminum coolant pipe 5.

Figure 8:
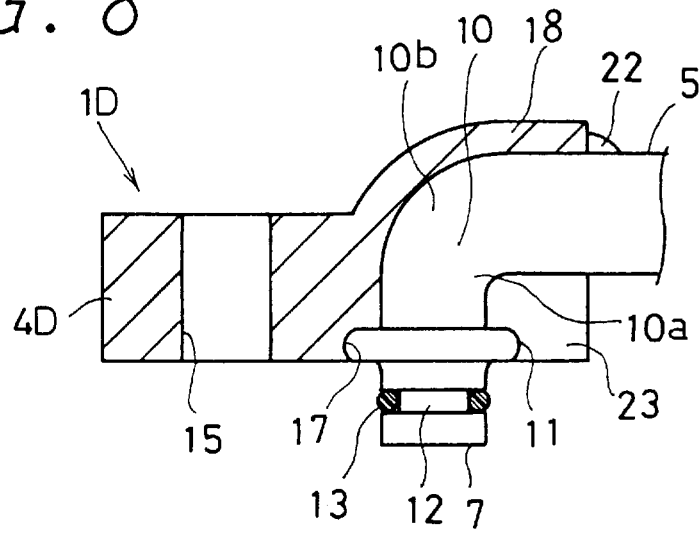
FIG. 8 is a partial side cross-sectional view illustrating the coolant pipe connecting coupling according to a fifth embodiment of the present invention.
Figure 9:
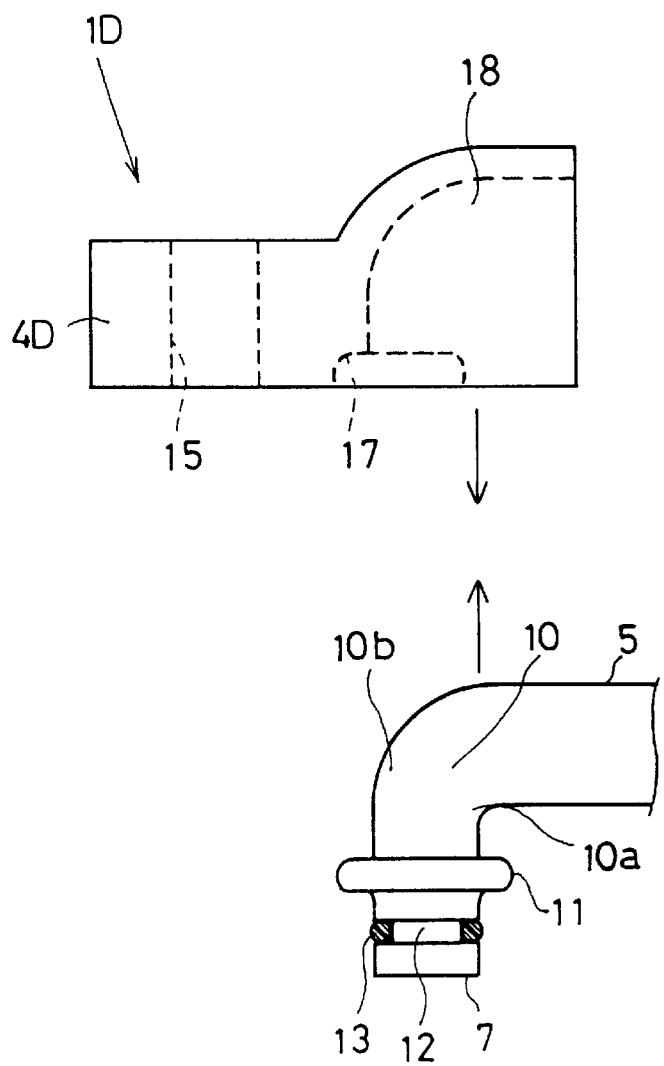
FIG. 9 is an exploded top view illustrating the coolant pipe connecting coupling according to the fifth embodiment of the present invention.
Figure 10:
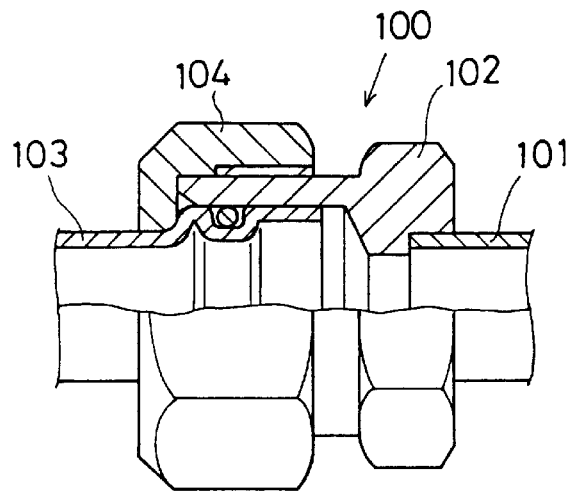
FIG. 10 is a partial cross-sectional view illustrating the coolant pipe connecting coupling according to the prior art.
Figure 11:
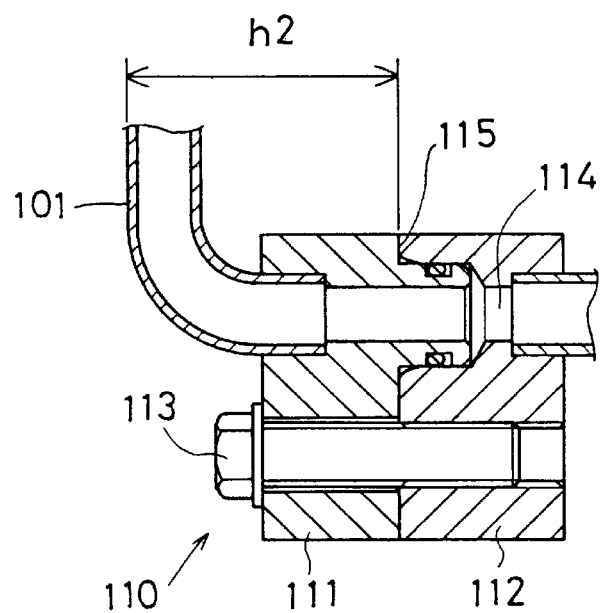
FIG. 11 is a partial cross-sectional view illustrating the coolant pipe connecting coupling according to the prior art.
Figure 12:
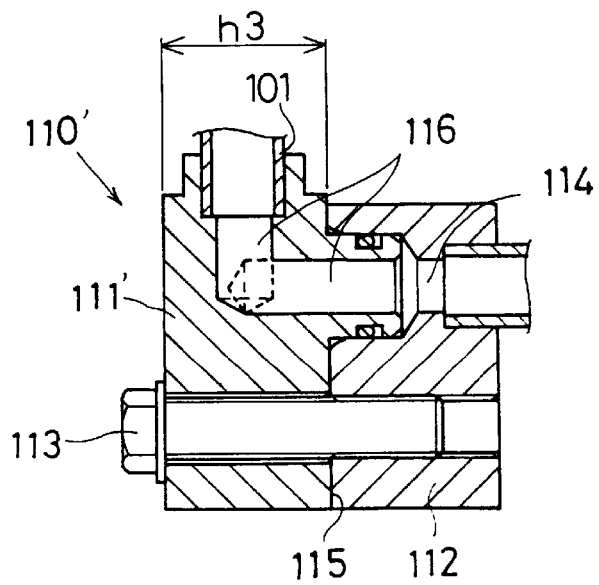
FIG. 12 is a partial cross-sectional view illustrating the coolant pipe connecting coupling according to the prior art.

FIGS. 8 and 9 illustrate a fifth embodiment. FIG. 8 is a partial side cross-sectional view illustrating the coolant pipe connecting coupling iD. FIG. 9 is an exploded side view illustrating the coolant pipe connecting coupling 1D.

In the fifth embodiment, the coolant pipe 5 having the bending portion 10, the ring seal portion 11 and the O-ring groove 12 is mounted at the fixing block 4 and the fixing block 4 and the coolant pipe 5 are fixed by a joining structure such as a braze 22, a weld, crimping or the like. A guiding portion 23 for guiding the bending portion 10 of the coolant pipe 5 into the pipe inserting hole 16 from the side of the ring receiving portion 17. From the guiding portion 23, an outside bending portion 10b of the bending portion 10 of the coolant pipe 5 is fixed while being in contact with the fixing block 4.

Although aluminum is preferably used as a material for the coolant pipe 5, a coolant pipe 5 made of copper, brass, stainless steel or the like can be used. Similarly, although aluminum and resin are preferably used as materials for the fixing block 4, copper, brass, stainless steel or the like can be used for the fixing block 4.

Although a bolt 5 is used as the connecting tool, an engaging method for engaging by joining a screw and a washer can be used. Although a method in which the fixing block 4 is fixed at the connecting object 2 by a bolt 3 is described, the fixing block 4 can be fixed at the connecting object 2 by a plurality of connecting tools.

Although a method in which a coolant pipe 5 is fixed at the fixing block 4 is described, a plurality of coolant passages can be connected at one assembly 4 by fixing the plurality of coolant pipes 5.

Although a method in which the O-ring groove 12 is formed at the connecting portion of the coolant pipe is described, the O-ring 12 can be mounted adjacent to the ring seal portion 11 by removing the O-ring groove 12.

Although the ring seal portion 11 is disposed on the periphery of the end portion of the connecting end portion 10 without being in contact with the O-ring 13, the ring seal portion 11 can be extended to be in contact with the O-ring 13.

Figure 13A:
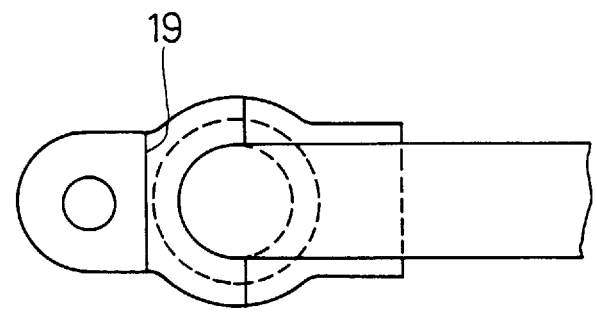
FIG. 13A is a top view illustrating a modification of the first embodiment.
Figure 13B:
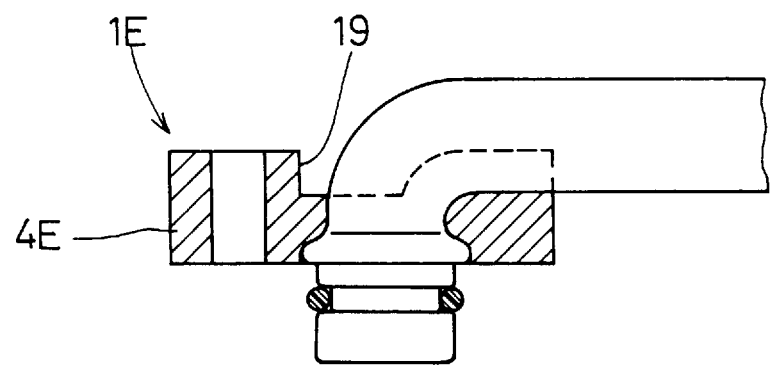
FIG. 13B is a partial cross-sectional view illustrating the modification of the first embodiment.

Further, as illustrated in FIGS. 13A and 13B, an edge surface 19 is formed in such a manner that a recess portion is provided in the fixing block 4E. According to this structure, the material for forming the fixing block 4E is reduced.

Figure 14A:
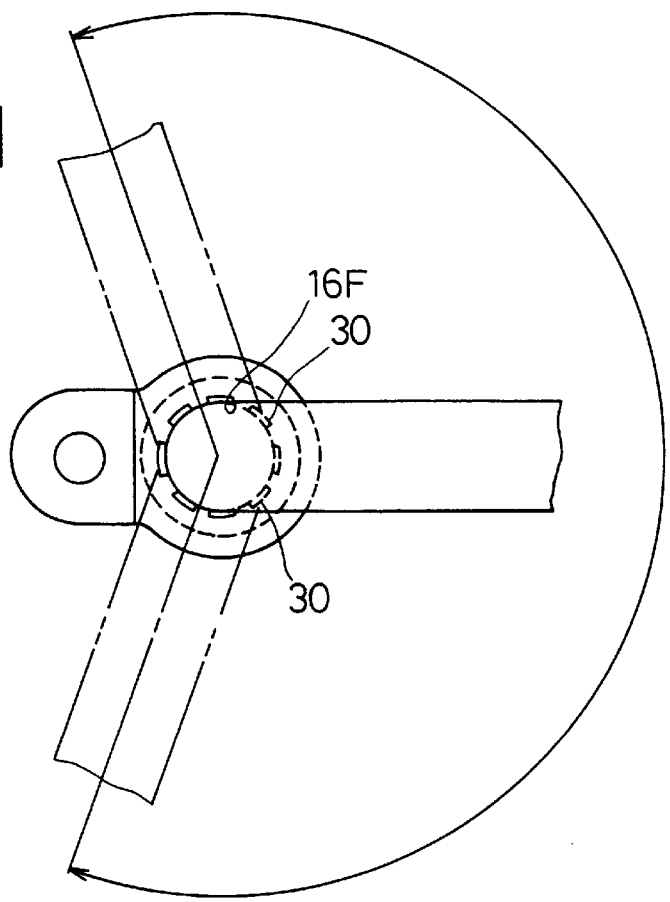
FIG. 14A is a top view illustrating another modification of the first embodiment.
Figure 14B:
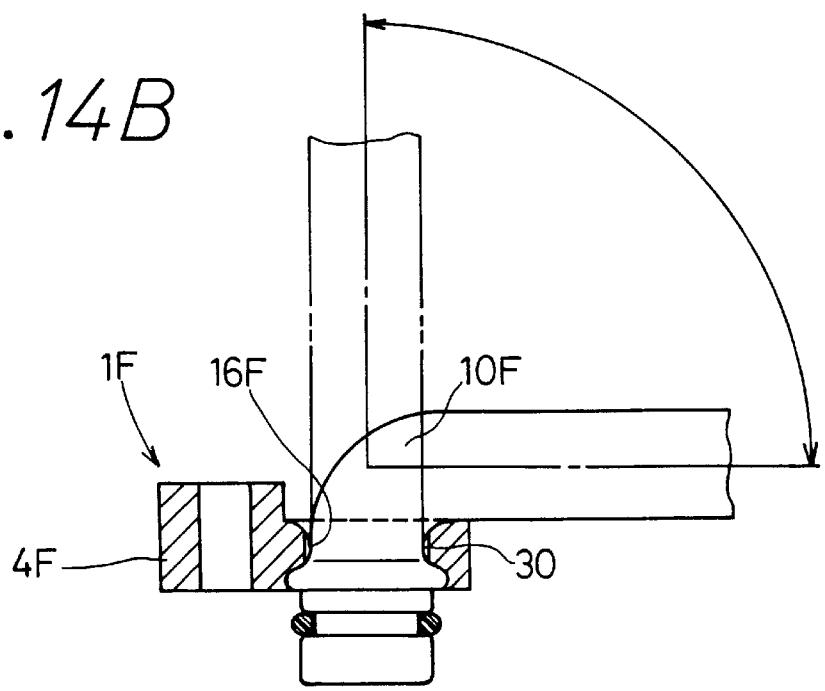
FIG. 14B is a partial cross-sectional view illustrating the another modification of the first embodiment.

Still further, as illustrated in FIGS. 14A and 14B, a plurality of knurled grooves 30 are formed in the pipe receiving hole 16F. According to this structure, a rotating position of the coolant pipe 5F is fixed by the knurled grooves 30. After the coolant pipe 5F is inserted into the pipe receiving hole 16F, the bending portion lOF is bent in a preferable direction.

The present invention having been described should not be limited to the disclosed embodiments, but it may be modified in many other ways without departing from the scope and the spirit of the invention. Such changes and modifications are to be understood as being included with the scope of the present invention as defined by the appended claims.

What is claimed is:

1. A coolant pipe connecting coupling comprising:
   a fixing block defining a receiving hole, said fixing block also defining a bending receiving portion and a ring receiving portion;
   a connecting object securable to said fixing block by a fixing tool, said connecting object defining an inside passage through which fluid can flow; and
   a coolant pipe supported by said fixing block, said coolant pipe having an L-shaped bending portion and a ring seal portion protruding from a periphery of an end of said coolant pipe, said coolant pipe being connected to said inside passage when said fixing block is fixed to said connecting object,
   wherein an inside bending portion of said bending portion of said coolant pipe is disposed in said bending receiving portion such that said inside bending portion is lower than a top surface of said fixing block,
   said ring seal portion of said coolant pipe is disposed in said ring receiving portion, and
   said fixing block is fixed between said inside bending portion and said upper surface of said ring seal portion such that the inside bending portion engages the receiving portion of the fixing block.

2. A coolant pipe connecting coupling according to claim 1, wherein said end of said coolant pipe is connected to said inside passage to hold an O-ring therebetween.

3. A coolant pipe connecting coupling according to claim 1, wherein said fixing block includes two fixing parts and divided surfaces of said fixing parts are disposed along said inserting hole of said fixing parts.

4. A coolant pipe connecting coupling according to claim 1, wherein said fixing block is made of resin.

5. A coolant pipe connecting coupling according to claim 1, wherein a joining structure is provided between said receiving hole of said fixing block and said coolant pipe.

6. A coolant pipe connecting coupling according to claim 1, wherein said fixing block includes a guiding portion for guiding said bending portion of said coolant pipe toward said receiving hole from a side of said ring receiving portion.

7. A coolant pipe connecting coupling according to claim 1, wherein a recess portion is provided in said fixing block around said bending portion.

8. A coolant pipe connecting coupling according to claim 1, wherein a plurality of knurled grooves are provided in said receiving hole to fix a rotating position of said coolant pipe.

9. A coolant pipe connecting coupling according to claim 1, wherein said bending receiving portion has a shape configured to receive said inside bending portion such that said inside bending portion is firmly and directly connected to said bending receiving portion.

10. A coolant pipe connecting coupling according to claim 1, wherein said upper surface of said ring seal portion is located above a connecting surface between said fixing block and said connecting object.

11. A coolant pipe connecting coupling according to claim 1, wherein said fixing block has a rectangular cross-sectional shape, and a connecting surface between said inside bending portion and said bending receiving portion is located under said top surface of said fixing block.

12. A coolant pipe connecting coupling according to claim 1, wherein the top surface of said fixing block is substantially planar.

* * * * *